United States Patent
Kawano et al.

(10) Patent No.: US 10,283,967 B2
(45) Date of Patent: May 7, 2019

(54) POWER SYSTEM MANAGEMENT DEVICE AND PROGRAM

(71) Applicant: OMRON CORPORATION, Kyoto (JP)

(72) Inventors: Junichi Kawano, Kyoto (JP); Yoshihito Hama, Osaka (JP)

(73) Assignee: OMRON CORPORATION, Kyoto (JP)

( * ) Notice: Subject to any disclaimer, the term of this patent is extended or adjusted under 35 U.S.C. 154(b) by 221 days.

(21) Appl. No.: 15/209,898

(22) Filed: Jul. 14, 2016

(65) Prior Publication Data
US 2017/0018930 A1  Jan. 19, 2017

(30) Foreign Application Priority Data

Jul. 15, 2015 (JP) .................. 2015-141368

(51) Int. Cl.
*H02J 3/38* (2006.01)
*H02J 13/00* (2006.01)
*H02S 50/00* (2014.01)

(52) U.S. Cl.
CPC .......... *H02J 3/383* (2013.01); *H02J 13/0013* (2013.01); *H02S 50/00* (2013.01); *Y02E 10/563* (2013.01);
(Continued)

(58) Field of Classification Search
CPC ............. H02J 13/0013; H02J 13/0006; H02J 13/0017; H02J 3/383; H02J 50/20; H02J 7/025
(Continued)

(56) References Cited

U.S. PATENT DOCUMENTS

| 2010/0138771 A1 | 6/2010 | Kumar et al. |
| 2012/0206273 A1* | 8/2012 | Kim .......................... H02J 3/14 340/870.02 |
| 2013/0311000 A1* | 11/2013 | Kudo ....................... H02J 3/46 700/296 |

FOREIGN PATENT DOCUMENTS

| JP | 2014-166114 A | 9/2014 |
| JP | 2015-037332 | 2/2015 |
| JP | 2015-073354 A | 4/2015 |

OTHER PUBLICATIONS

Office Action, dated Dec. 4, 2018, from the Japanese Patent Office (JPO) in the corresponding Japanese Patent Application No. 2015-141368.

\* cited by examiner

*Primary Examiner* — John W Poos
(74) *Attorney, Agent, or Firm* — Greenblum & Bernstein, P.L.C.

(57) ABSTRACT

A power system management device manages the operational states of a plurality of power systems each including a power generator and a power conditioner connected to each other, and can promptly inform a user of erroneous setting of configuration information. The management device stores configuration information in correspondence with each power system including a power generator (photovoltaic array) and a power conditioner connected to each other. The configuration information indicates the configuration of each power system and includes one or more configuration information elements set by a user. The management device determines whether the configuration information includes at least one configuration information element that has been possibly set erroneously using information obtained from the power conditioner of each power system, and outputs a message prompting verification (Continued)

and correction of configuration information determined to include at least one configuration information element that has been possibly set erroneously.

12 Claims, 10 Drawing Sheets

(52) U.S. Cl.
 CPC ........... *Y02E 40/72* (2013.01); *Y02E 60/7807* (2013.01); *Y04S 10/123* (2013.01); *Y04S 40/12* (2013.01)

(58) Field of Classification Search
 USPC ........................................ 307/84, 85, 86, 87
 See application file for complete search history.

Fig. 6

| | Power conditioner capacity | Panel capacity | Capacity Ratio | |
|---|---|---|---|---|
| Node 1 | 5.5 | 6.24 | 1.134545455 | |
| Node 2 | 5.5 | 4.08 | 0.741818182 | |
| Node 3 | 4.4 | 6.48 | 1.472727273 | ←Abnormal setting node |

POWER SYSTEM MANAGEMENT DEVICE AND PROGRAM

FIELD

The present invention relates to a power system management device for managing the operational states of a plurality of power systems each including a photovoltaic array and a power conditioner connected to each other. The invention also relates to a program for enabling a computer to operate as such a power system management device.

BACKGROUND

A management device for power systems known in the art can manage (or monitor) the power generating states of a plurality of power systems each including a photovoltaic array and a power conditioner connected to each other (refer to, for example, Patent Literature 1).

CITATION LIST

Patent Literature

Patent Literature 1: Japanese Unexamined Patent Application Publication No. 2015-37332

SUMMARY

Technical Problem

A management device that manages the power generating states of a plurality of power systems typically sets and uses configuration information for each power system (including the capacity of the photovoltaic array and the angle of direction in which the photovoltaic array is installed). Erroneous setting of configuration information would prevent the management device from functioning as designed. However, the management device known in the art has no function to detect erroneous setting of configuration information.

The management device known in the art may thus operate using erroneously set configuration information (or may not function as designed).

In response to this, one or more aspects of the present invention are directed to a power system management device for managing the operating states of a plurality of power systems each including a photovoltaic array and a power conditioner connected to each other, capable of promptly informing the user of erroneous setting of configuration information, and a program for enabling a computer to function as such a power system management device.

Solution to Problem

One aspect of the present invention provides a power system management device for managing operational states of a plurality of power systems each including a power generator and a power conditioner connected to each other. The management device includes a configuration information storage unit, a determination unit, and an output unit. The configuration information storage unit stores a plurality of pieces of configuration information in correspondence with the plurality of power systems. Each piece of configuration information indicates a configuration of a corresponding power system and includes one or more configuration information elements set by a user. The determination unit determines whether each piece of configuration information stored in the configuration information storage unit includes at least one configuration information element that has been possibly set erroneously, using information obtained from the power conditioner of the corresponding power system. The output unit outputs information for prompting verification and correction of a piece of configuration information determined by the determination unit to include at least one configuration information element that has been possibly set erroneously.

More specifically, the power system management device according to the aspect of the present invention is capable of determining whether the configuration information for each power system including one or more configuration information elements set by the user includes at least one configuration information element that has been possibly set erroneously, and outputting information for prompting verification and correction of the configuration information determined to include at least one configuration information element that has been possibly set erroneously. Thus, the power system management device according to the aspect of the present invention can promptly inform the user of erroneous setting of configuration information. As a result, this power system management device shortens the period in which the management device operates using erroneous configuration information (shortens the period in which the management device may not function as designed).

The power system management device according to the aspect of the present invention manages the operational states of the power systems each including the power generator that sets and uses configuration information (e.g., a photovoltaic array).

When the power generator is a photovoltaic array, the determination unit in the power system management device according to the aspect of the present invention obtains, from the power conditioner, information of the type selected in accordance with the configuration information element for which determination is performed as to whether the information element has been possibly set erroneously. For example, when the configuration information for each power system includes, as one of the configuration information elements, a panel capacity that is a capacity of the photovoltaic array included in the corresponding power system, the power system management device includes the determination unit that determines whether the panel capacity included in each piece of configuration information stored in the configuration information storage unit has been possibly set erroneously using a rated capacity of the power conditioner included in the corresponding power system obtained from the power conditioner. The power system management device includes the determination unit that determines whether the panel capacity included in each piece of configuration information stored in the configuration information storage unit has been possibly set erroneously using a ratio of the rated capacity of the power conditioner included in the corresponding power system to the panel capacity included in the piece of configuration information for the corresponding power system obtained from the power conditioner included in the corresponding power system.

In the power system management device according to the aspect of the present invention, the piece of configuration information for each power system includes, as one of the configuration information elements, a panel capacity that is a capacity of the photovoltaic array included in the corresponding power system, and the determination unit determines whether the panel capacity included in each piece of configuration information stored in the configuration information storage unit has been possibly set erroneously using output power from the photovoltaic array included in the corresponding power system obtained from the power conditioner included in the corresponding power system.

In the power system management device according to the aspect of the present invention, the piece of configuration information for each power system includes, as one of the configuration information elements, a rated capacity of the power conditioner included in the corresponding power system, and the determination unit determines that a piece of configuration information including a rated capacity different from the rated capacity of the power conditioner included in each power system obtained from the power conditioner has been possibly set erroneously.

In the power system management device according to the aspect of the present invention, the piece of configuration information for each power system includes, as one of the configuration information elements, direction information indicating a direction in which the photovoltaic array included in the corresponding power system is installed, and the determination unit determines whether the direction information included in each piece of configuration information stored in the configuration information storage unit has been possibly set erroneously using a time change pattern of output power from the photovoltaic array included in the corresponding power system obtained from the power conditioner included in the corresponding power system.

In the power system management device according to the aspect of the present invention, the piece of configuration information for each power system includes connection information indicating a connection between a plurality of solar panels included in the photovoltaic array in the corresponding power system, and the determination unit determines whether the connection information included in each piece of configuration information stored in the configuration information storage unit has been possibly set erroneously using an open-circuit voltage or a short-circuit current of the corresponding power system obtained from the power conditioner included in the corresponding power system.

The power system management device according to the aspect of the present invention further includes a replacement unit that replaces, for two pieces of configuration information each determined by the determination unit to include a configuration information element of the same type that has been possibly set erroneously, the configuration information element that has been possibly set erroneously in one of the two pieces of configuration information with the configuration information element that has been possibly set erroneously in the other piece of configuration information. The replacement unit replaces the configuration information elements of the two pieces of configuration information when receiving an instruction from the user to replace the configuration information elements.

In the power system management device according to the aspect of the present invention, each power system allows reverse power flow of output power from the power conditioner to a utility grid, and the management device further includes an output reduction unit that controls the power conditioner included in each power system to have output power that is X times the panel capacity included in the piece of configuration information corresponding to each power system, where X<1. The output reduction unit controls, for a power system that has a ratio of the panel capacity to a rated capacity of the power conditioner not less than a predetermined value, the power conditioner included in the power system using a panel capacity estimated from the rated capacity of the power conditioner. The output reduction unit further estimates, for a configuration information element set by the user and determined to have been possibly set erroneously by the determination unit, a correct configuration information element, and controls the power conditioner by using one of the configuration information element set by the user or the estimated configuration information element that causes less reverse power flow.

Another aspect of the present invention provides a program executable by a computer communicable with a plurality of power systems each including a power generator and a power conditioner connected to each other. The program enables the computer to function as a configuration information storage unit, a determination unit, and an output unit. The configuration information storage unit stores a plurality of pieces of configuration information in correspondence with the plurality of power systems. Each piece of configuration information indicates a configuration of a corresponding power system, and includes one or more configuration information elements set by a user. The determination unit determines whether each piece of configuration information stored in the configuration information storage unit includes at least one configuration information element that has been possibly set erroneously, using information obtained from the power conditioner of the corresponding power system. The output unit outputs information for prompting verification and correction of a piece of configuration information determined by the determination unit to include at least one configuration information element that has been possibly set erroneously. The program according to the aspect of the present invention can promptly inform the user of erroneous setting of configuration information.

Advantageous Effects

The power system management device and the program according to one or more embodiments of the present invention can promptly inform the user of erroneous setting of configuration information.

BRIEF DESCRIPTION OF THE DRAWINGS

FIG. 6 is a table describing second setting error detection.

DETAILED DESCRIPTION

Embodiments of the present invention will now be described with reference to the drawings.

Figure 1:
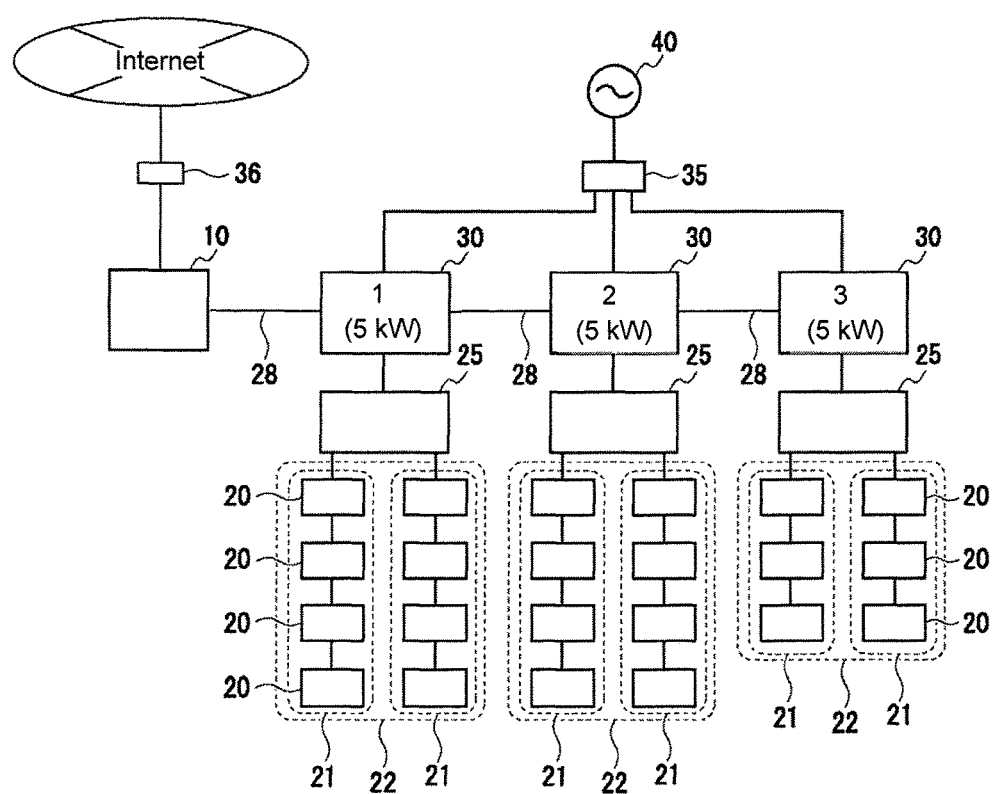
FIG. 1 is a diagram describing the use pattern of a power system management device according to one embodiment of the present invention.
Figure 2:
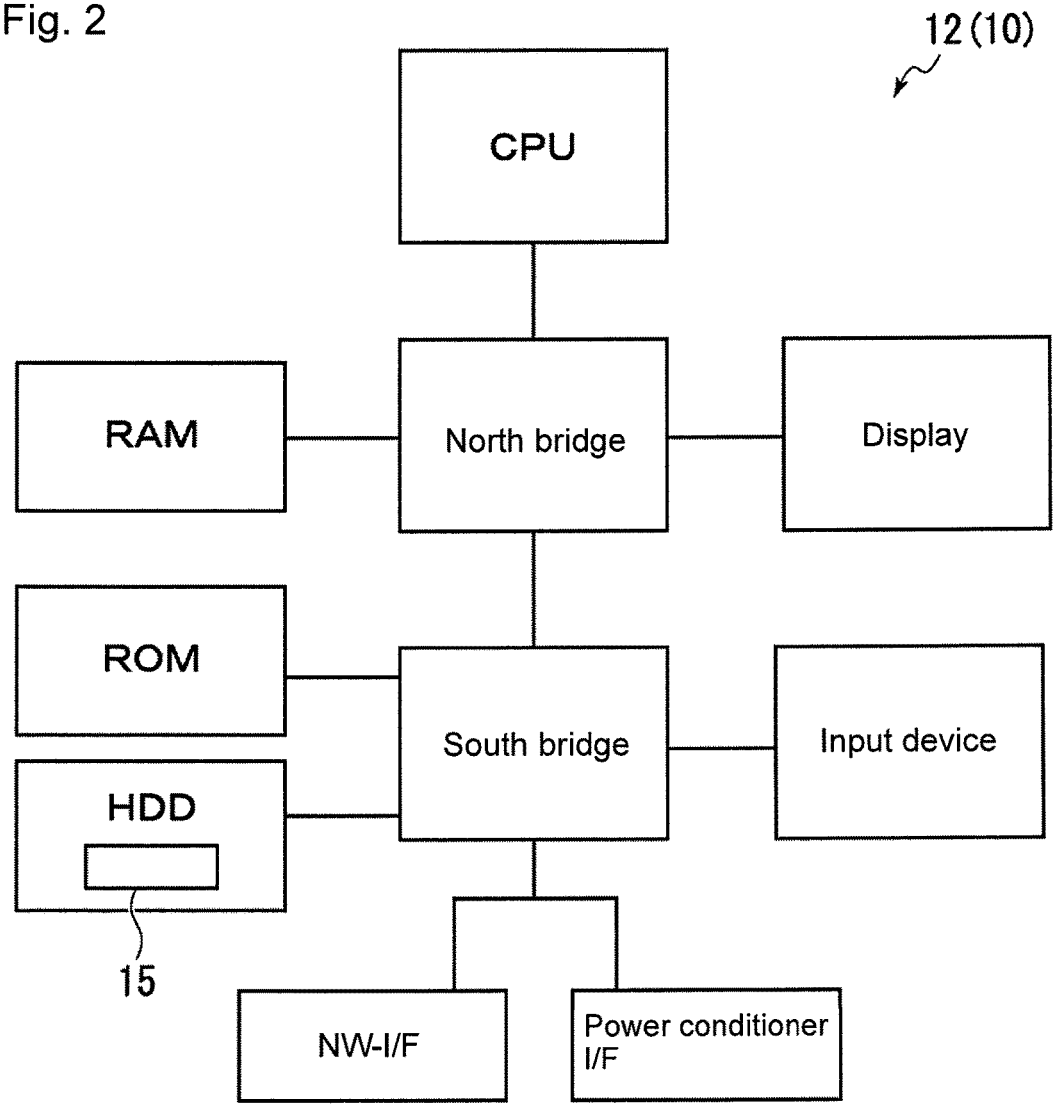
FIG. 2 is a diagram showing the hardware configuration of the power system management device according to one embodiment.

FIG. 1 is a diagram describing the use pattern of a power system management device 10 according to one embodiment of the present invention. FIG. 2 is a diagram showing the hardware configuration of the power system management device 10.

The use pattern and the hardware configuration of the power system management device 10 according to the present embodiment will now be described with reference to these drawings.

As shown in FIG. 1, the power system management device 10 manages a plurality of power systems that are connected to a utility grid 40 in parallel via a distribution switchboard 35. A power system herein refers to a system including a photovoltaic array 22 connected to a power conditioner 30 via a junction box 25. In FIG. 1, the power conditioners 30 are labeled with reference numerals, such as 1 and 2, which are the node numbers set in the power conditioners 30 (described in detail later). Each power conditioner 30 also has a numerical value in parentheses, such as 5 kW, which is the maximum rated output (hereafter, the power conditioner capacity) of each power conditioner 30.

As shown in the figure, the power system management device 10 is daisy-chained to the power conditioner 30 included in each power system with a communication line 28 and is connected to the Internet via a router 36. The power system management device 10 is used in this state.

As shown in the figure, the photovoltaic array 22 included in each power system managed by the power system management device 10 typically includes a plurality of strings 21, each of which contains a plurality of solar panels 20 connected in series. A photovoltaic array 22 may include a single string 21. In that case, the photovoltaic array 22 is directly connected to the corresponding power conditioner 30.

The power system management device 10 according to the present embodiment is implemented by using a computer 12 with the configuration shown in FIG. 2, onto which a program 15 has been installed. The computer functioning as the power system management device 10 may not have the configuration shown in FIG. 2, but may have any hardware configuration including an interface that allows communication with a device providing an output reduction instruction to the power system management device 10, which is a network interface (NW-I/F) for connecting to the Internet in FIG. 2, and an interface to allow communication with the power conditioners 30. Further, the power system management device 10 may be implemented by using two computers that wirelessly communicate with each other (for example, a computer operated by a user and a computer that obtains information from the power conditioners 30).

The functions of the power system management device 10 will now be described. The functions of the power system management device 10 described below are implemented by a CPU executing the program 15 loaded onto a random-access memory (RAM) after read from a hard disk drive (HDD) of the computer 12 (FIG. 2).

The power system management device 10 is programmed to perform a configuration information check process, an information collection process, and an operational state management process. The power system management device 10 is also programmed to execute output reduction control.

The configuration information check process, the information collection process, and the operational state management process will now be described.

Figure 3:
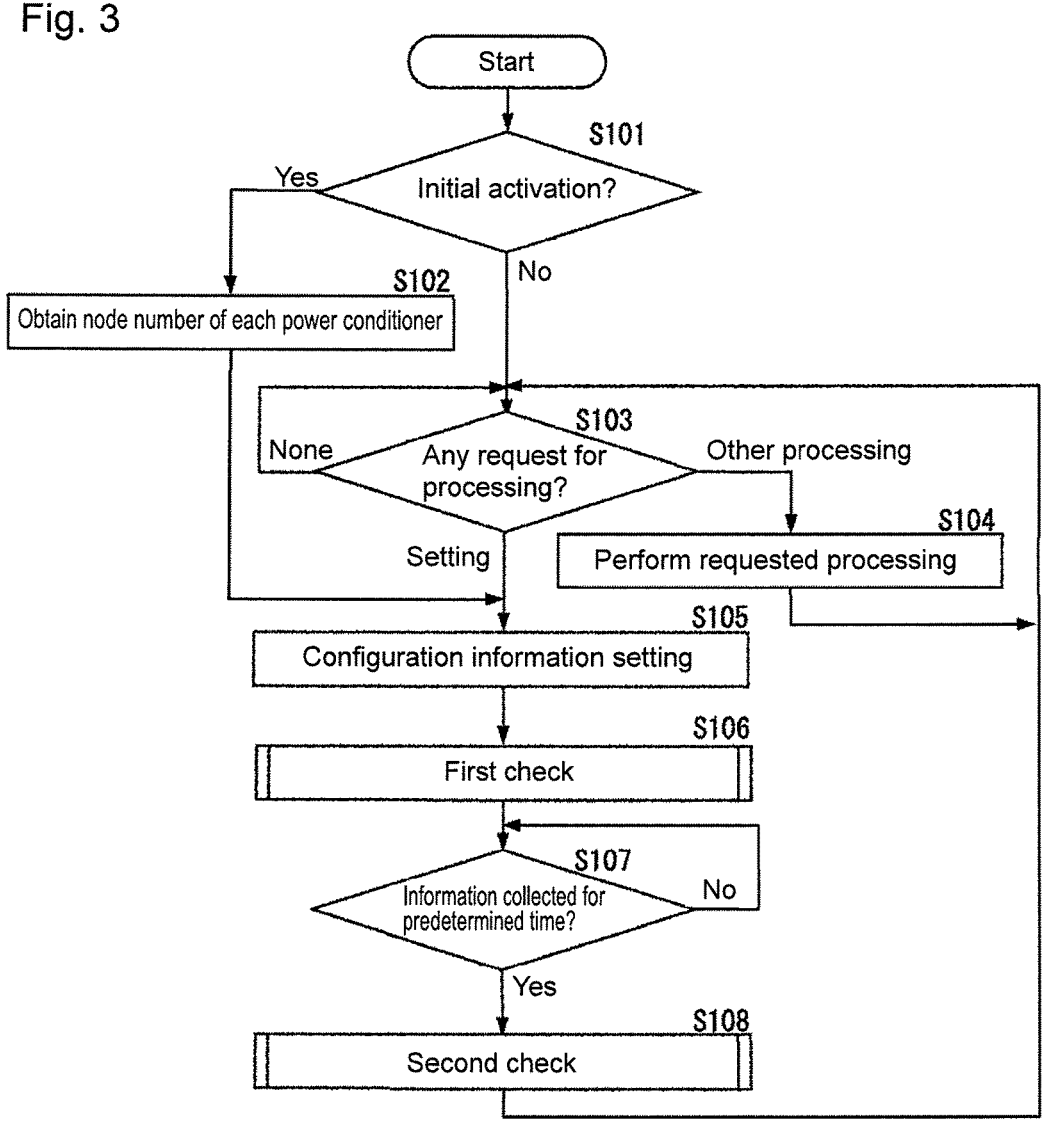
FIG. 3 is a flowchart showing a configuration information check process performed by the power system management device.

The configuration information check process follows the procedure shown in FIG. 3. The power system management device 10 (or simply the management device 10) starts the configuration information check process when activated (powered on).

The management device 10, which has been activated to start the configuration information check process, determines whether this activation is the initial activation (step S101).

For the initial activation (step S101: Yes), the management device 10 obtains the node number of each power conditioner 30 in step S102.

The node number herein refers to an integer in a predetermined range used by the management device 10 to specify a communication partner. A different node number is set for the power conditioner 30 of each power system managed by the management device 10 before the management device 10 is activated. In step S102, the management device 10 attempts to communicate with devices having node numbers within the predetermined range to obtain the node number of each power conditioner 30.

For ease of explanation, node numbers 1 to M are obtained in step S102 (refer to FIG. 1). Hereafter, the power conditioner 30 having node number n (where n is 1 to M) is referred to as the power conditioner with node n, and the power system including the power conditioner with node n is referred to as node n.

The management device 10, which has obtained the node number of each power conditioner 30, displays a predetermined screen on its display, and performs processing (not shown) that prompts a user (a person who has installed the management device 10 or an actual user of the management device) to set the latitude and the longitude of the location at which each power system is installed (hereafter, system location information). The processing includes prompting the user to directly set the system location information, or prompting the user to set the address of the location to obtain the system location information from the set address.

The management device 10 then performs configuration information setting for prompting the user to set configuration information (step S105).

For the configuration information setting, the management device 10 first displays a node selection screen on the display to allow the user to select a node for which configuration information is to be set.

When node n is selected, the management device 10 displays a setting screen on the display to allow the user to set configuration information for node n.

The displayed setting screen can be used to set the information listed below as configuration information.

Power conditioner capacity: the maximum rated output of the power conditioner with node n Panel capacity: the capacity of the photovoltaic array 22 connected to the power conditioner with node n (the total rated capacity of each solar panel 20 included in the photovoltaic array 22)

Panel direction: the direction in which the photovoltaic array 22 connected to the power conditioner with node n is installed (e.g., its angle of direction or the direction to the south)

Connection information: the number of strings 21 included in the photovoltaic array 22 connected to the power conditioner with node n, and the number of solar panels 20 included in each string 21

The setting screen described above shows configuration information that has already been set.

When the user sets configuration information for node n, the management device 10 stores the set configuration information in correspondence with node number n in its internal memory (HDD). The management device 10 then redisplays the node selection screen on the display.

Upon receiving an operation to end the configuration information setting during display of the power conditioner selection screen or the setting screen, the management device 10 determines whether any node (power system) remains without its configuration information being set. When finding any node without set configuration information, the management device 10 displays a message indicating that a node remains without set configuration information on the display to prompt the user to set the configuration information for the node. The management device 10 continues the configuration information setting.

When finding no node without set configuration information, the management device 10 ends the configuration information setting upon receiving an operation to end the configuration information setting.

The management device 10, which ends the configuration information setting, starts a first check (step S106). The management device 10 starts the information collection process and the operational state management process when the configuration information setting is complete (when the configuration information setting started after the initial activation ends), although these processes are not shown in the flowchart.

The information collection process includes periodically collecting information about, for example, power generated by the photovoltaic array 22 from the power conditioner 30 included in each node (power system). The information collection process also includes regularly collecting an open-circuit voltage and a short-circuit current at the photovoltaic array 22 from the power conditioner 30 included in each power system. The information collected in the information collection process is hereafter referred to as operational state information.

The operational state management process includes detecting an abnormal phenomenon by analyzing the operational state information, and transmitting the details of the detected abnormal phenomenon to the user. The operational state management process includes processing performed using the configuration information, or for example, determining whether the power generated by the photovoltaic array 22 is less than the power generation estimated using the set panel capacity to detect any decrease in the power generation efficiency of the photovoltaic array 22.

Before the first check is described in detail, the operation of the management device 10 performed when the activation is not the initial activation (step S101: No) will now be described.

When the activation is not the initial activation (step S101: No), the management device 10, which has started the information collection process and the operational state management process (not shown), waits for (or monitors) an input request for causing processing in step S103.

When receiving an input request for causing processing other than the configuration information setting (step S103: other processing), the management device 10 performs the requested processing in step S104, and then returns to step S103. In step S104, the management device 10 performs, for example, a screen display process for displaying a screen showing a graph representing the power generation state of a specific node per day or per month using the operational state information (information collected in the information collection process) together with the configuration information for this node on the display.

When receiving an input request to perform the configuration information setting (step S103: setting), the configuration information setting described above in detail is performed in step S105. The management device 10, which ends the configuration information setting, starts the first check (step S106).

Figure 4:
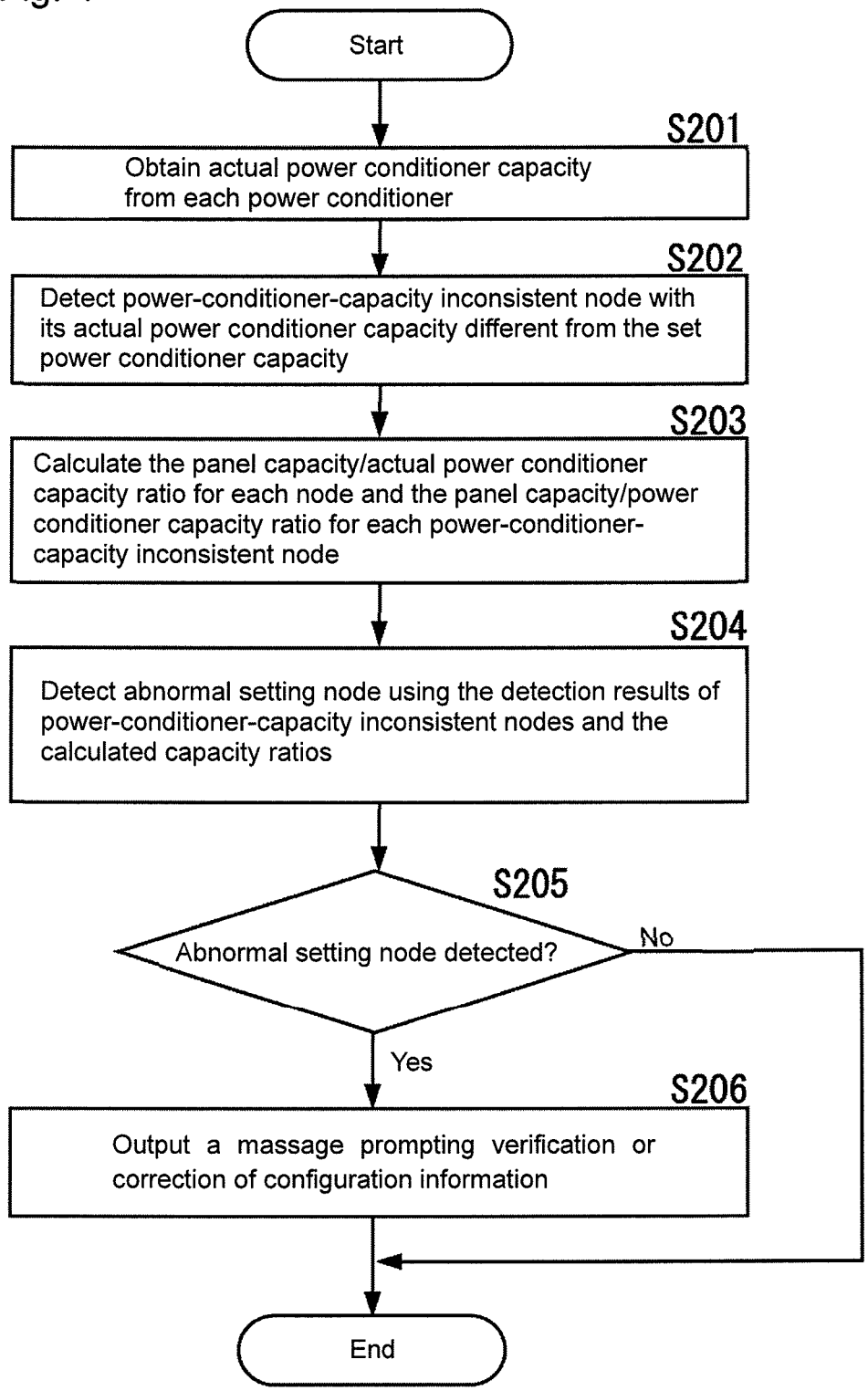
FIG. 4 is a flowchart showing a first check performed in the configuration information check process.

The first check follows the procedure shown in FIG. 4. More specifically, the management device 10, which has started the first check, first obtains the actual power conditioner capacity from each power conditioner 30 (step S201).

The management device 10 then detects a node (hereafter, a power-conditioner-capacity inconsistent node) for which the actual power conditioner capacity differs from the power conditioner capacity indicated by the configuration information (hereafter, the set power conditioner capacity) (step S202). This processing may not detect any power-conditioner-capacity inconsistent node.

Subsequently, the management device 10 calculates the ratio of the panel capacity to the actual power conditioner capacity for each node (step S203). When one or more power-conditioner-capacity inconsistent nodes have been detected, the management device 10 also calculates the ratio of the panel capacity to the set power conditioner capacity for each power-conditioner-capacity inconsistent node in step S203.

The management device 10, which ends the processing in step S203, detects a node with abnormal setting (abnormal setting node) using the detection results of power-conditioner-capacity inconsistent nodes and the calculated capacity ratios (the ratio of the panel capacity to the actual power conditioner capacity, and the ratio of the panel capacity to the set power conditioner capacity) (step S204).

An abnormal setting node detected in step S204 is either a node for which configuration information has been set erroneously or a node for which configuration information has been possibly set erroneously.

In other words, each power-conditioner-capacity inconsistent node is detected as an abnormal setting node through the processing in step S204. The processing further detects, as an abnormal setting node, a node that is not a power-conditioner-capacity inconsistent node and is a node with the ratio of the panel capacity to the actual power conditioner capacity failing to fall Within a predetermined capacity ratio range.

Figure 5:
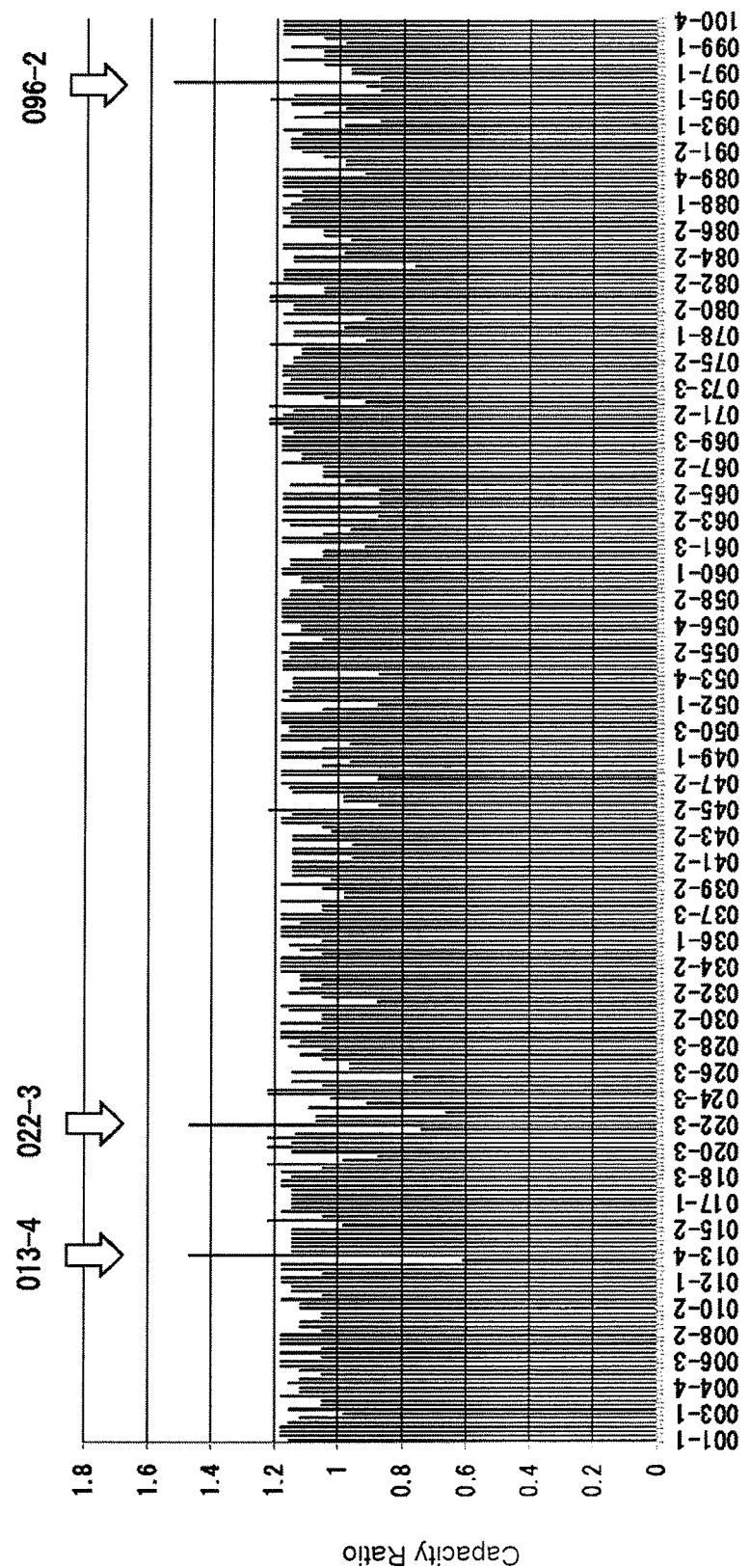
FIG. 5 is a graph showing the capacity ratio calculated from the actually set panel capacity and the actual power conditioner capacity for each node.

As shown in FIG. 5, more specifically, the power conditioner 30 is normally connected to the photovoltaic array 22 having the capacity of about 1 to 1.2 times larger than the capacity of the power conditioner 30. FIG. 5 is a graph showing the capacity ratio calculated from the panel capacity actually set in the previous version of the management device 10 (previous-version device before being improved into the management device 10) and the actual power conditioner capacity for each node (power system). The horizontal axis in FIG. 5 shows identification information (001-1, 013-4, . . . ) for each node.

Each node with its ratio of the panel capacity to the actual power conditioner capacity failing to fall within the predetermined capacity ratio range (e.g., not more than 1.3) (nodes 013-4, 022-3, and 096-2 in FIG. 5) can be determined to have an erroneously set panel capacity.

The management device 10, which has completed detection of abnormal setting nodes, then determines whether two nodes have been detected as power-conditioner-capacity inconsistent nodes. When two nodes A and B are powerconditioner-capacity inconsistent nodes, the management device 10 performs first setting error detection.

In the first setting error detection, the management device 10 first determines whether the power-conditioner-capacity inconsistent nodes A and B have the same actual power conditioner capacity. When the power-conditioner-capacity inconsistent nodes A and B have the same actual power conditioner capacity, the management device 10 ends the first setting error detection.

When the power-conditioner-capacity inconsistent nodes A and B have different actual power conditioner capacities, the management device 10 determines whether the three conditions below are satisfied.

Condition 1: the actual power conditioner capacity for power-conditioner-capacity inconsistent node A=the set power conditioner capacity for power-conditioner-capacity inconsistent node B Condition 2: the actual power conditioner capacity for power-conditioner-capacity inconsistent node B=the set power conditioner capacity for power-conditioner-capacity inconsistent node A Condition 3: the ratio of the panel capacity to the set power conditioner capacity calculated for each of power-conditioner-capacity inconsistent nodes A and B falls within the capacity ratio range.

The conditions 1 to 3 are normally satisfied when configuration information for node A is set as configuration information for node B, and configuration information B for node B is set as configuration information for node A (when these two pieces of configuration information are correct but have been set erroneously for wrong nodes).

When one or more of the conditions 1 to 3 are not satisfied, the management device 10 performs no processing and ends the first setting error detection and the processing in step S204. When the conditions 1 to 3 are all satisfied, the management device 10 determines that the configuration information for node A has been erroneously set for node B and the configuration information for node B has been erroneously set for node A. The management device 10 stores this determination result, before ending the first setting error detection and the processing in step S204.

The management device 10, which has completed detection of abnormal setting nodes, determines whether a single abnormal setting node has been detected when no power-conditioner-capacity inconsistent node has been detected. When two or more abnormal setting nodes have been detected or when no abnormal setting node has been detected, the management device 10 ends the processing in step S204.

When a single abnormal setting node has been detected, the management device 10 starts second setting error detection. The management device 10 first calculates the capacity ratio by dividing the panel capacity for abnormal setting node $\alpha$ by the actual power conditioner capacity for node $\beta$ having the smallest panel capacity, and the capacity ratio by dividing the panel capacity for node $\beta$ by the actual power conditioner capacity for abnormal setting node $\alpha$. When the second setting error detection is performed, the set power conditioner capacity for each node is identical to its actual power conditioner capacity. Thus, the set power conditioner capacity may be used in calculating these capacity ratios.

Subsequently, the management device 10 determines whether the calculated two capacity ratios both fall within the capacity ratio range. When the two capacity ratios are both within the capacity ratio range, the management device 10 determines that the panel capacity for node $\alpha$ has been set as the panel capacity for node $\beta$ and the panel capacity for node $\beta$ has been set as the panel capacity for node $\alpha$. The management device 10 stores this determination result. The management device 10 ends the second setting error detection and the processing in step S204.

The second setting error detection will now be described in more detail. FIG. 6 shows the power conditioner capacity and the panel capacity set for nodes 1 to 3. In this example, the power conditioner capacity set for each node is correct.

In this example, node 3, which has a capacity ratio failing to fall within the capacity ratio range, is detected as an abnormal setting node in step S204. No node is detected as a power-conditioner-capacity inconsistent node. The second setting error detection is started.

Node 2 has the smallest panel capacity. In the second setting error detection, the capacity ratio is calculated as 1.178182 by dividing the panel capacity for node 3 by the power conditioner capacity for node 2. Also, the capacity ratio is calculated as 0.927273 by dividing the panel capacity for node 2 by the power conditioner capacity for node 3. These capacity ratios fall within the capacity ratio range. The management device 10 determines that the panel capacity for node 2 has been set for node 3, and the panel capacity for node 3 has been set for node 2, and ends the second setting error detection and the processing in step S204.

When detecting no abnormal setting node in step 204 (step S205: No), the management device 10, which ends the processing in step S204, performs no further processing and ends the first check.

When detecting one or more abnormal setting nodes in step S204 (step S205: No), the management device 10 outputs a massage prompting verification or correction (re-configuration) of the configuration information for each detected abnormal setting node (step S206). In step S206, the management device 10 according to the present embodiment displays the message prompting verification or correction of the configuration information for each abnormal setting node on the display. The processing in step S206 may be any processing to output information for prompting verification or correction of the configuration information for each abnormal setting node. The processing in step S206 includes outputting the message by sound, or displaying identification information for each abnormal setting node in a special manner on the screen showing identification information for each node.

When determining that configuration information for node A has been erroneously set for node B and configuration information for node B has been erroneously set for node A, the management device 10 displays a dialog box on the display to allow the user to select whether to replace the configuration information set for node A with the configuration information set for node B in step S204. When the user selects such replacement of the configuration information, the management device 10 replaces the configuration information for node A with the configuration information for node B, and then ends the processing in step S206 and the first check. When the user selects no such replacement of the configuration information, the management device 10 ends the processing in step S206 and the first check without replacement of the configuration information.

When determining that the panel capacity for node $\alpha$ has been erroneously set for node $\beta$ and the panel capacity for node $\beta$ has been erroneously set for node $\alpha$, the management device 10 also displays a similar dialog box as described above on the display. When the user selects replacement of the panel capacity, the management device 10 replaces the panel capacity set for node $\alpha$ with the panel capacity set for node $\beta$, and ends the processing in step S206 and the first check. When the user selects no such replacement, the management device 10 ends the processing in step S206 and the first check without replacement of the panel capacity.

As shown in FIG. 3, the management device 10, which has completed the first check (step S106), immediately starts a second check (step S108) when information has been collected for a predetermined time up to the present (e.g., 24 hours) in the information collection process (step S107: Yes). When information for the predetermined time has yet to be collected (step S107: No), the management device 10 starts the second check (step S108) after collecting information for the predetermined time (step S107: Yes). The determination in step S107 may be to determine whether information has been collected to determine the time at which maximum power is generated by each photovoltaic array 22. The management device 10 accepts a request for causing processing while waiting for completion of the information collection for the predetermined time in step S107, although this is not shown in the flowchart (FIG. 3). When receiving a request for causing processing other than the configuration information setting during the processing performed in step S107, the management device 10 first performs the requested processing, and then waits for completion of the information collection for the predetermined time in step S107. When receiving a request for the configuration information setting input during the processing performed in step S107, the management device 10 starts the processing in step S105 and subsequent steps.

Figure 7:
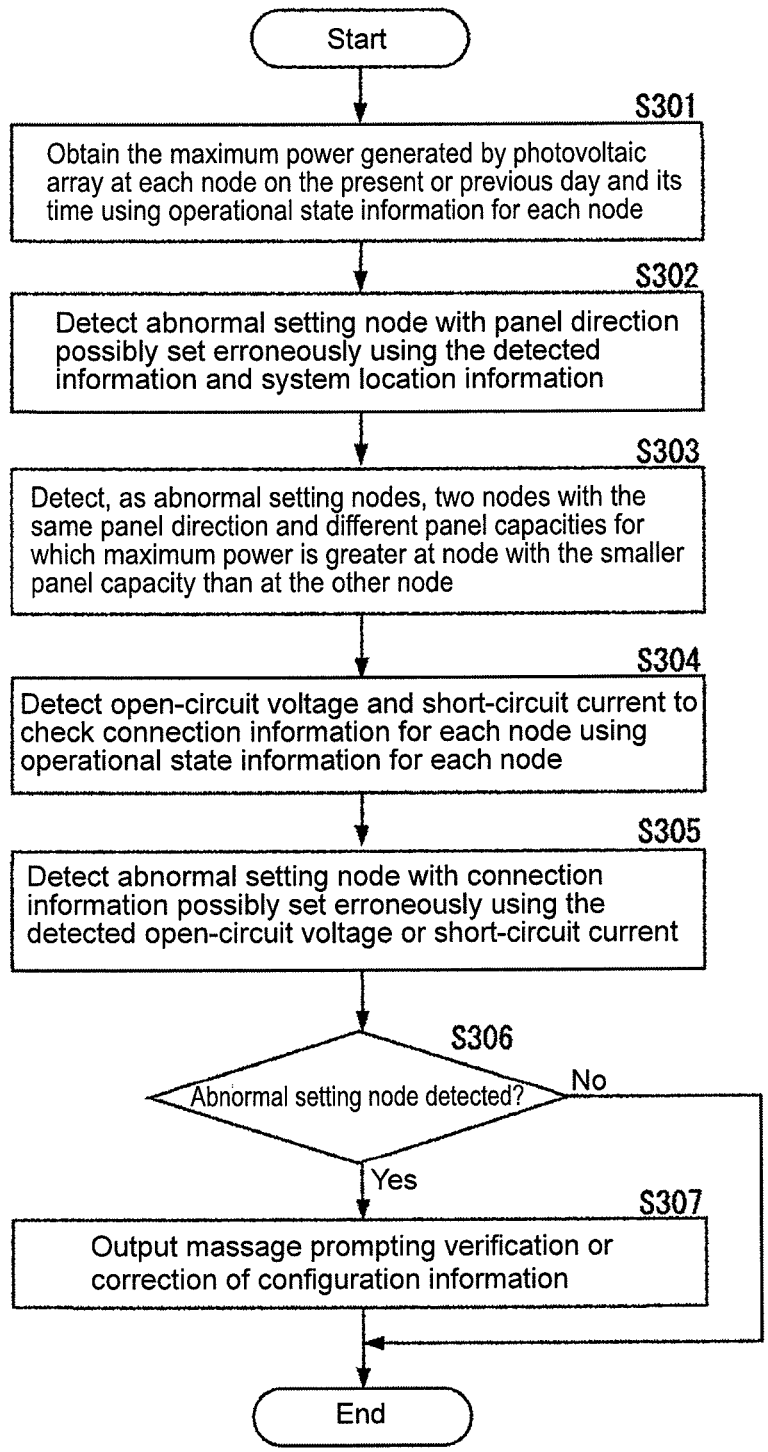
FIG. 7 is a flowchart showing a second check performed in the configuration information check process.

The second check performed by the management device 10 follows the procedure shown in FIG. 7.

More specifically, the management device 10, which has started the second check, first obtains, for each node, the maximum power generated by the photovoltaic array 22 and the time at which the maximum power is generated on the present day or the previous day using the operational state information for each node (step S301). The maximum power generated by the photovoltaic array 22 on the present day or the previous day refers to the maximum power most lately generated by the photovoltaic array 22.

The management device 10 then detects an abnormal setting node for which a panel direction has been possibly set erroneously using the obtained time, the date and year of the present day or the previous day, and the set system location information (the latitudes and the longitudes of the locations of the plurality of power systems to be managed) (step S302).

The solar direction and the solar irradiation at given time at the location having the latitude and longitude known can be determined through calculations. When the panel direction is correct, the time at which maximum power is generated by the photovoltaic array 22 for each node can be calculated by using the latitudes and longitudes of the locations of the plurality of power systems to be managed, the date and year, and the set panel direction.

In step S302, the management device 10 calculates the time described above by basically using the panel direction set for each node. The management device 10 then detects a node having the absolute value of the difference between the calculated time and the obtained time exceeding a predetermined upper limit of the time difference as an abnormal setting node for which a panel direction has been possibly set erroneously.

When detecting two abnormal setting nodes a and b in the processing described above, the management device 10 further determines whether the two conditions described below are satisfied.

The absolute value of the difference between the time calculated for abnormal setting node a and the time obtained for abnormal setting node b is not more than the upper limit of the time difference.

The absolute value of the difference between the time calculated for abnormal setting node b and the time obtained for abnormal setting node a is not more than the upper limit of the time difference.

When the two conditions are satisfied, the management device 10 determines that the panel direction for node a has been erroneously set for node b and the panel direction for node b has been erroneously set for node a. The management device 10 stores this determination result.

When three or more abnormal setting nodes have been detected, the management device 10 determines whether the absolute value of the time difference for each abnormal setting node will be not more than the upper limit of the time difference in the same manner if these values used in the comparison are replaced with one another. When the management device 10 determines that the absolute value of the time difference for each abnormal setting node will be not more than the upper limit of the time difference if these values used in the comparison are replaced with one another, the management device 10 determines that the panel direction set for each abnormal setting node has been possibly specified erroneously. The management device 10 stores this determination result.

In step S303, the management device 10, which has completed the processing described above, detects, as abnormal setting nodes, two nodes with the same panel direction and different panel capacities and with the maximum power generated by the node with the smaller panel capacity being greater than the maximum power generated by the other node. The management device 10 determines that the panel capacity for one of the two nodes has been possibly set erroneously for the other node. The management device 10 stores this determination result. The management device 10 then ends the processing in step S303.

Figure 8:
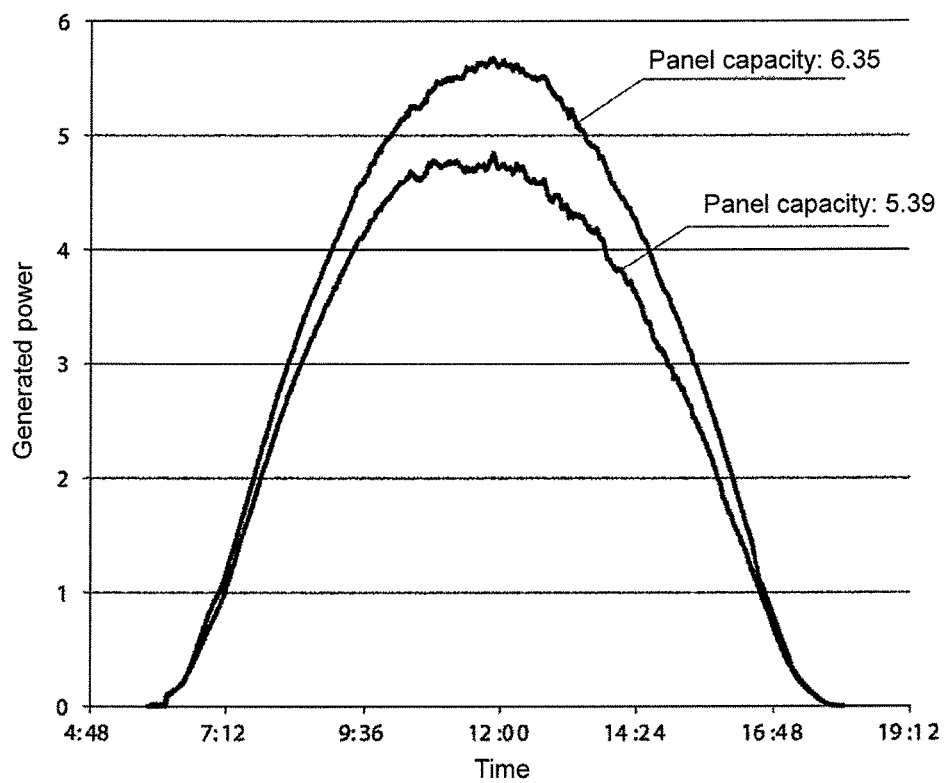
FIG. 8 is a graph showing the relationship between the panel capacity and the generated power.

More specifically, when two photovoltaic arrays 22 have the same panel direction, the maximum power generated by the photovoltaic array 22 with the greater panel capacity is greater than the maximum power generated by the other photovoltaic array 22 as shown in FIG. 8. When two nodes have the same panel direction and different panel capacities, and the maximum power generated by the node having the smaller panel capacity is greater than the maximum power generated by the other node, the panel capacity set for one or both of the two nodes has been possibly set erroneously. Further, the panel capacity for one of the two nodes may have been possibly set erroneously for the other node. In this case, the above processing is performed in step S303.

The management device 10, which has completed the processing in step S303, detects an open-circuit voltage and a short-circuit current, which are used to check connection information for each node using the operational state information for each node (step S304). In step S304, the management device 10 detects, from a plurality of pairs of open-circuit voltages and short-circuit currents included in the operational state information for each node, an open-circuit voltage and a short-circuit current indicating a generated power value near the maximum power value.

The management device 10, which has completed the processing in step S304, detects an abnormal setting node for which connection information has been possibly set erroneously, using the detected open-circuit voltage or short-circuit current (step S305).

In step S305, the management device 10 calculates the number of solar panels 20 included in the string 21 to which the largest number of solar panels 20 are connected (hereafter, the number of series-connected panels) and the number of strings 21 (hereafter, the number of parallel-connected panels) using the connection information. When detecting a plurality of nodes with different numbers of series-connected panels, the management device 10 detects any of these detected nodes having its open-circuit voltage value failing to be in the order of the numbers of serial-connected panels. The management device 10 detects such a node as an abnormal setting node. When detecting a plurality of nodes with different numbers of parallel-connected plates and the same number of serial-connected panels, the management device 10 determines whether any of these detected nodes has an inappropriate relationship between the short-circuit current value and the number of parallel-connected panels, and then detects such a node as an abnormal setting node.

The processing in step S304 will now be described in more detail.

Figure 9:
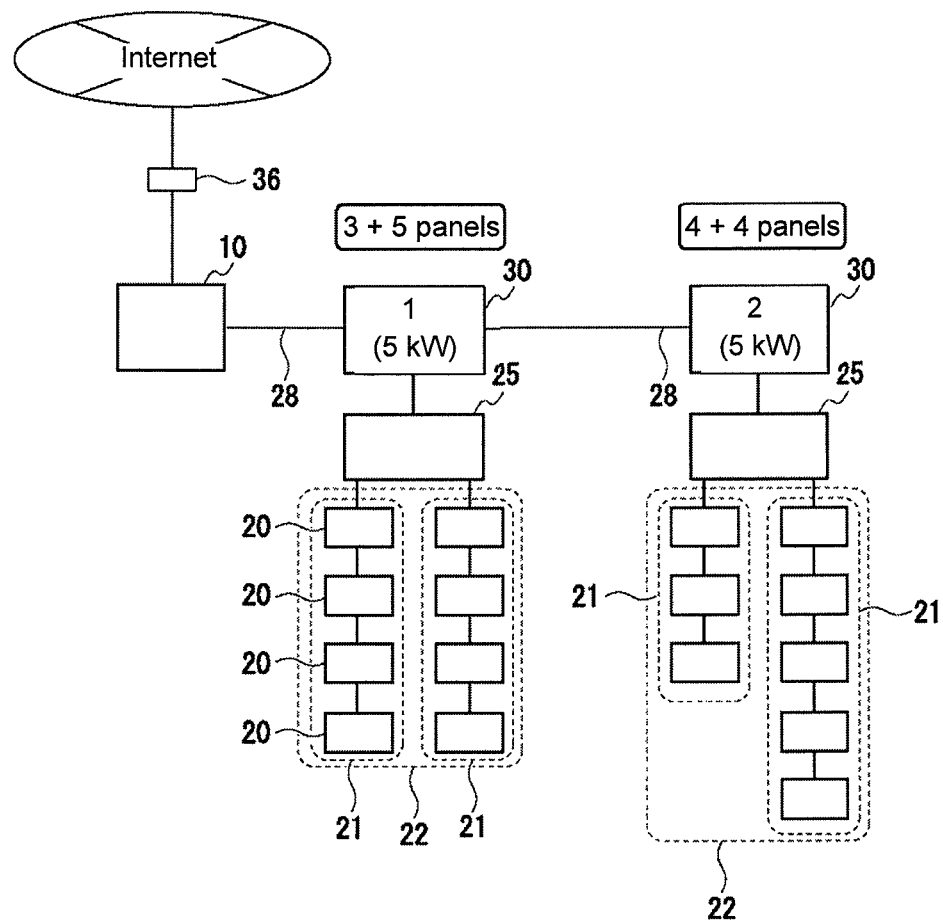
FIG. 9 is a diagram describing the processing in step S304 included in the second check.

In the example shown in FIG. 9, the power conditioner with node 1 is connected to two strings 21 in each of which four solar panels 20 are connected in series, and the power conditioner with node 2 is connected to one string 21 in which three solar panels 20 are connected in series and one string 21 in which five solar panels 20 are connected in series. The connection information for node 1 (4+4 panels) is erroneously set for node 2, and the connection information for node 2 (3+5 panels) is erroneously set for node 1.

In this case, nodes 1 and 2 have different numbers of serial-connected panels. The management device 10 detects any node having an open-circuit voltage failing to be in the order of the numbers of serial-connected panels. In the illustrated structure, nodes 1 and 2 each have an open-circuit voltage failing to be in the order of the numbers of serial-connected panels. In the example shown in FIG. 8, both nodes 1 and 2 are detected as abnormal setting nodes.

Figure 10:
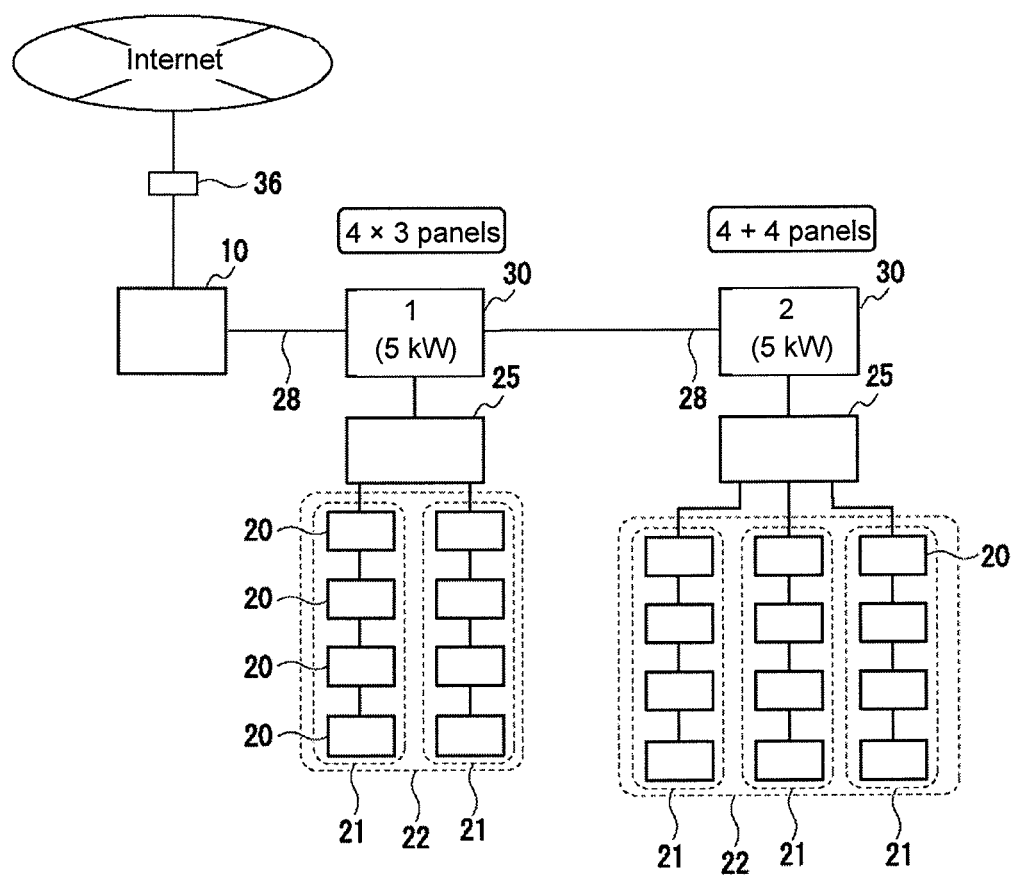
FIG. 10 is a diagram describing the processing in step S304 included in the second check.

As shown in FIG. 10, the power conditioner with node 1 is connected to two strings 21 in each of which four solar panels 20 are connected in series, and the power conditioner with node 2 is connected to three strings 21 in each of which four solar panels 20 are connected in series. The connection information for node 1 is erroneously set for node 2, and the connection information for node 2 is erroneously set for node 1.

In this case, nodes 1 and 2 are a plurality of nodes having different numbers of parallel-connected panels and the same number of serial-connected panels. The management device 10 then detects, from nodes 1 and 2, a node having an inappropriate relationship between the short-circuit current value and the number of parallel-connected panels as an abnormal setting node. In the example shown in FIG. 10, node 2, which has erroneously been set to have a smaller number of parallel-connected panels than node 1 and thus supposedly has a greater short-circuit current, has a short-circuit current smaller than the short-circuit current set for node 1. In this case, the management device 10 detects nodes 1 and 2 as abnormal setting nodes.

The management device 10, which has completed the processing in step S305 (FIG. 7), performs no processing and ends the second check when detecting no abnormal setting node (step S306: No).

When detecting one or more abnormal setting nodes (step S306: Yes), the management device 10 outputs a message prompting verification or correction (reconfiguration) of the configuration information for each abnormal setting node (step S307).

When determining that configuration information contains an information element (e.g., the panel direction) erroneously set for a wrong node, the management device 10 displays a dialog box on the display to allow the user to select whether to replace the configuration information in step S307. When the user selects such replacement of the configuration information, the management device 10 replaces the configuration information, and then ends the processing in step S307 and the first check. When the user selects no such replacement of the configuration information, the management device 10 ends the processing in step S307 and the second check without replacement of the configuration information.

The management device 10, which has completed the second check, returns to step S103 (FIG. 3), and waits for (or monitors) an input of a request for causing processing.

The output reduction control executed by the management device 10 will now be described.

When receiving a first command indicating a reverse power flow not exceeding X % of the power conditioner capacity of each power conditioner 30 to the utility grid 40 from a server on the Internet, the management device 10 controls each power conditioner 30 to permit a reverse power flow not exceeding X % of the power conditioner capacity to the utility grid 40. When receiving a second command indicating a reverse power flow not exceeding X % of the panel capacity of each power conditioner 30 to the utility grid 40 from the server, the management device 10 controls each power conditioner 30 to permit a reverse power flow not exceeding X % of the panel capacity to the utility grid 40.

When receiving the second command, the management device 10 calculates, for each power system with the ratio of the panel capacity to the rated capacity of the power conditioner 30 being not less than Y (e.g., 1.3), the estimated value of the panel capacity by multiplying the rated capacity of the power conditioner 30 in each power system by a factor of Y. The management device 10 controls the power conditioner 30 included in each power system having the ratio of the panel capacity to the rated capacity of the power conditioner being not less than Y to permit a reverse power flow not exceeding X % of the estimated value of the panel capacity to the utility grid 40.

More specifically, when the ratio of the power conditioner 30 of the panel capacity to the rated capacity is not less than Y (e.g., 1.3), the panel capacity is highly likely to be greater than the actual panel capacity as described above (refer to FIG. 5). In this case, the output reduction performed using the set panel capacity would allow the management device 10 to reduce the output by an amount smaller than an amount expected by a power company. The output reduction performed using an estimated value of the panel capacity calculated with the above procedure would allow the management device 10 to reduce the output by an amount near the amount expected by the power company. Thus, the management device 10 executes the output reduction control with the above procedure when receiving the second command.

As described above, the power system management device 10 according to the present embodiment checks the set or corrected (or reconfigured) configuration information for each node from various viewpoints when the user sets or corrects the configuration information (the power conditioner capacity, the panel capacity, the panel direction, and the connection information) for each node (power system). When detecting one or more pieces of configuration information that have been possibly set erroneously, the power system management device 10 displays a message prompting verification or correction of the detected pieces of configuration information on the display. The user can then promptly correct the erroneously set configuration information. As a result, the power system management device shortens the period in which the management device operates using erroneous configuration information (shortens the period in which the management device may not function as designed).

Modifications

The power system management device 10 described above may be modified variously. For example, the power conditioner capacity may be corrected. The first check (FIG. 4) may be modified to the processing in which the power conditioner capacity indicated by the configuration information is overwritten with the actual power conditioner capacity without sending an inquiry to the user when the actual power conditioner capacity differs from the power conditioner capacity indicated by the configuration information. In the first check according to this modification, the configuration information elements other than the power conditioner capacity are to be replaced, instead of the entire configuration information being replaced.

The first check and the second check may both be modified to the processing in which the information replacement is performed without sending an inquiry to the user. The power system management device 10 may control a plurality of power systems each including a power generator other than the photovoltaic array 22 (e.g., a wind power generator or a fuel cell) connected to the power conditioner.

When determining that the set panel capacity is erroneous, the power system management device 10 described above estimates the correct panel capacity, and controls the power conditioner by selectively using either the panel capacity set by the user or the estimated panel capacity that would cause less reverse power flow. The power system management device 10 may be modified to perform such output reduction using a configuration information element other than the panel capacity, and to control the power conditioner by selectively using either the panel capacity indicated by the configuration information element set by the user or the estimated configuration information element that would cause less reverse power flow. The power system management device 10 may also be modified to perform processing with a procedure different from the procedure described above. The power system management device 10 may manage a plurality of power systems with a multi-string power conditioner that functions as a plurality of power conditioners 30.

REFERENCE SIGNS LIST 10 power system management device
12 computer
15 program
20 solar panel
21 string
22 photovoltaic array
25 junction box
28 communication line
30 power conditioner
35 switchboard
36 router
40 utility grid

The invention claimed is:

1. A power system management device for managing operational states of a plurality of power systems, each power system including a power generator, which includes a photovoltaic array, and a separate power conditioner connected to the photovoltaic array, the management device comprising:
    a configuration information storage configured to store a plurality of pieces of configuration information in correspondence with the plurality of power systems, each piece of configuration information indicating a configuration of a corresponding power system and including one or more configuration information elements set by a user;
    a determiner configured to determine whether each piece of configuration information stored in the configuration information storage includes at least one configuration information element that has been possibly set erroneously, using information obtained from the power conditioner of the corresponding power system; and
    an output configured to output information for prompting verification and correction of a piece of configuration information determined by the determiner to include at least one configuration information element that has been possibly set erroneously,
    wherein the piece of configuration information for each power system includes, as one of the configuration information elements, a panel capacity that is a capacity of the photovoltaic array included in the corresponding power system, and
    the determiner is configured to determine whether the panel capacity included in each piece of configuration information stored in the configuration information storage has been possibly set erroneously using a rated capacity of the power conditioner included in the corresponding power system obtained from the power conditioner.

2. The power system management device according to claim 1,
    wherein the determiner is configured to determine whether the panel capacity, included in each piece of configuration information stored in the configuration information storage, has been possibly set erroneously using a ratio of the rated capacity of the power conditioner included in the corresponding power system to the panel capacity included in the piece of configuration information for the corresponding power system obtained from the power conditioner included in the corresponding power system.

3. The power system management device according to claim 1,
    wherein the determiner is configured to determine whether the panel capacity included in each piece of configuration information stored in the configuration information storage has been possibly set erroneously using output power from the photovoltaic array included in the corresponding power system obtained from the power conditioner included in the corresponding power system.

4. The power system management device according to claim 1,
    wherein the piece of configuration information for each power system includes, as one of the configuration information elements, a rated capacity of the power conditioner included in the corresponding power system, and the determiner is configured to determine that a piece of configuration information including a rated capacity different from the rated capacity of the power conditioner included in each power system obtained from the power conditioner has been possibly set erroneously.

5. The power system management device according to claim 1,
wherein the piece of configuration information for each power system includes, as one of the configuration information elements, direction information indicating a direction in which the photovoltaic array included in the corresponding power system is installed, and
the determiner is configured to determine whether the direction information included in each piece of configuration information stored in the configuration information storage has been possibly set erroneously using a time change pattern of output power from the photovoltaic array included in the corresponding power system obtained from the power conditioner included in the corresponding power system.

6. The power system management device according to claim 1,
wherein the piece of configuration information for each power system includes connection information indicating a connection between a plurality of solar panels included in the photovoltaic array in the corresponding power system, and
the determiner is configured to determine whether the connection information included in each piece of configuration information stored in the configuration information storage has been possibly set erroneously using an open-circuit voltage or a short-circuit current of the corresponding power system obtained from the power conditioner included in the corresponding power system.

7. The power system management device according to claim 1, further comprising:
a replacer configured to replace, for two pieces of configuration information each determined by the determiner to include a configuration information element of the same type that has been possibly set erroneously, the configuration information element that has been possibly set erroneously in one of the two pieces of configuration information with the configuration information element that has been possibly set erroneously in the other piece of configuration information.

8. The power system management device according to claim 7,
wherein the replacer is configured to replace the configuration information elements of the two pieces of configuration information when receiving an instruction from the user to replace the configuration information elements.

9. The power system management device according to claim 1,
wherein each power system allows reverse power flow of output power from the power conditioner to a utility grid, and
the management device further includes an output reducer configured to control the power conditioner included in each power system to have output power that is X times the panel capacity included in the piece of configuration information corresponding to each power system, where X<1.

10. The power system management device according to claim 9,
wherein the output reducer is configured to control, for a power system that has a ratio of the panel capacity to a rated capacity of the power conditioner not less than a predetermined value, the power conditioner included in the power system using a panel capacity estimated from the rated capacity of the power conditioner.

11. The power system management device according to claim 9,
wherein the output reducer is configured to estimate, for a configuration information element set by the user and determined to have been possibly set erroneously by the determiner, a correct configuration information element, and control the power conditioner by using one of the configuration information element set by the user or the estimated configuration information element that causes less reverse power flow.

12. A non-transitory storage medium that includes a program, executable by a computer, communicable with a plurality of power systems, each power system including a power generator, which includes a photovoltaic array, and a separate power conditioner connected to the photovoltaic array, the program, which when executed, enabling the computer to function as:
a configuration information storage configured to store a plurality of pieces of configuration information in correspondence with the plurality of power systems, each piece of configuration information indicating a configuration of a corresponding power system and including one or more configuration information elements set by a user;
a determiner configured to determine whether each piece of configuration information stored in the configuration information storage includes at least one configuration information element that has been possibly set erroneously, using information obtained from the power conditioner of the corresponding power system; and
an output configured to output information for prompting verification and correction of a piece of configuration information determined by the determiner to include at least one configuration information element that has been possibly set erroneously,
wherein the piece of configuration information for each power system includes, as one of the configuration information elements, a panel capacity that is a capacity of the photovoltaic array included in the corresponding power system, and
the determiner is configured to determine whether the panel capacity included in each piece of configuration information stored in the configuration information storage has been possibly set erroneously using a rated capacity of the power conditioner included in the corresponding power system obtained from the power conditioner.

* * * * *